United States Patent [19]

Niwa et al.

[11] Patent Number: 5,399,030

[45] Date of Patent: Mar. 21, 1995

[54] TAPE PRINT DEVICE HAVING PRINT FORMAT CONTROL

[75] Inventors: Akihiko Niwa, Toki; Hideo Ueno; Shoji Sakuragi, both of Nagoya, all of Japan

[73] Assignee: Brother Kogyo Kabushiki Kaisha, Nagoya, Japan

[21] Appl. No.: 28,267

[22] Filed: Mar. 9, 1993

[30] Foreign Application Priority Data

Apr. 30, 1992 [JP] Japan ................. 4-139931

[51] Int. Cl.⁶ ............................. B41J 5/30
[52] U.S. Cl. ........................... 400/61; 400/3; 400/76; 400/586
[58] Field of Search ............ 400/120, 208, 586, 708, 400/61, 76, 3

[56] References Cited

U.S. PATENT DOCUMENTS 5,066,152  11/1991  Kuzuya et al. .
5,078,523   1/1992  McGourty et al. .
5,222,818   6/1993  Akiyama et al. .............. 400/120
5,253,334  10/1993  Kimura et al. ................ 400/586
5,314,256   5/1994  Niwa ............................ 400/61

FOREIGN PATENT DOCUMENTS 0073975   4/1987  Japan ............................ 400/61
1281963  11/1989  Japan ............................ 400/61
2-106555  4/1990  Japan .
2241807   9/1991  United Kingdom .......... 400/61

Primary Examiner—Edgar S. Burr
Assistant Examiner—John S. Hilten
Attorney, Agent, or Firm—Oliff & Berridge

[57] ABSTRACT

The document data of a plurality of blocks are input and an auto size is set. After this, when a print key is operated, the data concerning the width of a tape is read out by a cassette distinction sensor. Then, the block number is calculated based on the document data stored in the text memory, and further, the linage of the first block is calculated. The print size is calculated based on the size table corresponding to the tape width data and the linage to be printed. The base line position of each print line is calculated based on the print size, the document data, the tape width data and the linage. The dot pattern data in each line which is formed based on the print size and the document data is developed into the print buffer based on the base line position. When the processing in each block is completed, the print processing is executed. Thus, various blocks of print on the tape may be set to different sizes.

18 Claims, 11 Drawing Sheets

Fig.7B

| ITEM | INSTRUCTIONS |
|---|---|
| S61 | READ OUT THE DATA CONCERNING THE WIDTH OF THE TAPE |
| S62 | DOCUMENT DATA TO BE PRINTED STORED ? |
| S63 | CALCULATE THE NUMBER OF BLOCKS |
| S64 | BC ← N |
| S65 | AF = 1 ? |
| S66 | READ OUT AND STORE THE DOCUMENT DATA OF THE BLOCK |
| S67 | CALCULATE THE LINAGE L |
| S68 | SET AUTO SIZE AP |
| S69 | CALCULATE BASE LINE POSITION OF EACH PRINT LINE |
| S70 | DEVELOP THE DOT PATTERN DATA INTO THE PRINT BUFFER |
| S71 | BC ← (BC-1) |
| S72 | BC = 0 ? |
| S73 | READ OUT AND STORE THE DOCUMENT DATA OF THE BLOCK |
| S74 | CALCULATE THE LINAGE L |
| S75 | ALL CHARACTERS ABLE TO BE PRINTED ? |
| S76 | BUZZER MAKES SOUND |

Fig.9

```
                     32
SET CHARACTER SIZE
1:10  2:13  3:19  4:26  5:38  6:44  7:AUTO
```

TAPE PRINT DEVICE HAVING PRINT FORMAT CONTROL

BACKGROUND OF THE INVENTION

1. Field of the Invention

The present invention relates to a tape print device, and more particularly, to a tape print device capable of setting a character size according to the linage to be printed in each block, thereby a plurality of characters and symbols in each block are printed with the set character size.

2. Description of the Related Art

Conventionally, as described in U.S. Pat. No. 5,066,152, a tape print device is capable of printing characters and symbols on a tape as a printing medium (for instance, the tape being about 10 mm or 24 mm in width). The tape print device is suitable for printing a file name on a tape to be pasted to the back cover of the file, for example.

However, known tape print devices can not print more than three lines. Moreover, when a tape print device prints two lines, the character size is fixed for two lines. That is, when the tape print device prints two lines, the tape print device recognizes the tape area to be printed as an upper line and a lower line by dividing the tape area into two parts in the longitudinal direction. The conventional tape print device prints characters and symbols with the fixed character size on the upper line and/or the lower line. Moreover, the conventional tape print device does not have a block key for setting the character column according to the linage to be printed.

On the other hand, there is another tape print device having a function for printing characters and symbols in a plurality of lines on the tape.

When the document data stored in a text memory is printed in the desired linage, for example, in two or three lines, the tape print device sets the character size fixed according to the linage to be printed.

Suppose that there are some character columns comprising two lines or three lines. Then, there is an occasion when the tape print device has to continuously print these character columns as a character string. In this case, the tape print device sets the character size so as to be able to print characters and symbols in maximum linage. Therefore, even if the linage to be printed is changed, the tape print device prints characters and symbols with the fixed character size. Then, when the tape print device prints characters and symbols in minimum linage, the character size of the character column comprising the minimum linage is small with respect to the width of the tape. Therefore, there is a problem that the characters and symbols are not printed in a well-balanced arrangement on the tape.

SUMMARY OF THE INVENTION

It is therefore an object of the present invention to provide a tape print device capable of setting a character size in each block according to the linage to be printed.

The tape print device of the present invention comprises: an input means for inputting characters, symbols and various commands; a print means including print heads for printing on a tape as a print medium with dot patterns; an input data storing means for storing the data of characters and symbols inputted from the input means; a print control means for making the dot pattern data based on the data of the input data storing means and for controlling the print means such that the print means executes the print operation; a block specifying means for grouping characters and symbols and for specifying the group as block data comprising one or a plurality of lines; and a size set means for receiving the data of characters and symbols stored in the input data storing means and the block data specified by the block specifying means, thereby setting the size of characters and symbols to print each block according to the linage of the block.

In the tape print device of the present invention, the print control means creates the dot pattern data based on the data of characters and symbols stored in the input data storing means and controls the print means such that the print means executes the print operation. The block specifying means groups characters and symbols and specifies the group as block data comprising one or a plurality of lines. The size set means receive the data of characters and symbols stored in the input data storing means and the block data specified by the block specifying means, thereby setting the size of characters and symbols to print each block according to the linage of the block.

Thus, the size of characters and symbols to be printed is set according to the linage in each block. Therefore, even if the linage of each block increases or decreases, characters and symbols are printed in each block in a well-balanced arrangement with respect to the width of the tape.

The tape print device of the present invention comprises the block specifying means and the size set means. The block specifying means groups characters and symbols and specifies the group as block data comprising one or a plurality of lines. The size set means automatically sets the size of characters and symbols in each block. That is, the size of characters and symbols to be printed is automatically set in each block according to the linage of the block. Therefore, even if the linage of each block increases or decreases, the characters and symbols are printed in each block in a well-balanced arrangement with respect to the width of the tape.

BRIEF DESCRIPTION OF THE DRAWINGS

A preferred embodiment of the present invention will be described in detail with reference to the following figures wherein:

FIG. 7B is a chart listing the steps of the flow chart of FIG. 7A;

FIG. 9 is a view showing a sample character size set screen; and

DETAILED DESCRIPTION OF PREFERRED EMBODIMENTS

Hereinafter, an embodiment of the present invention will be explained with reference to the appended figures.

The present embodiment described below applies the present invention to a tape print device for English capable of printing a plurality of characters, such as alphabets, symbols, or the like, on a tape for printing (a tape as a print medium).

Figure 1:
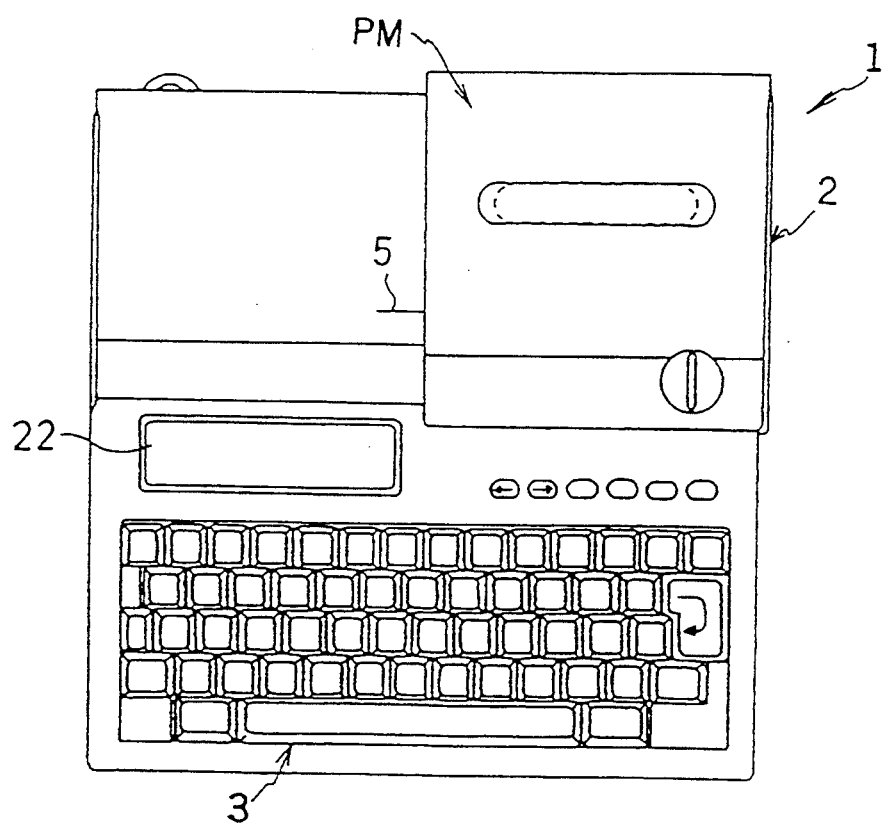
FIG. 1 is a plan view of a tape print device in accordance with the present invention.

As shown in FIG. 1, a keyboard 3 is disposed at the front of a main frame 2 of a tape print device 1. At the rear of the keyboard 3, a print mechanism PM is installed in the main frame 2. A liquid crystal display 22 capable of displaying characters and symbols is disposed at the rear of the keyboard 3.

The keyboard 3 comprises character keys for inputting alphabets, figures and symbols, a space key, a new line key for starting a new line, a new block key for starting a new block, cursor movement keys for moving a cursor in leftward and rightward directions, a document making key for making document data, a format set key for setting a print format, a size set key for setting the size of characters to be printed, a type face set key for setting the type face of characters to be printed, a print key for executing a print operation, and a power supply key for turning on or off the power supply.

Figure 2:
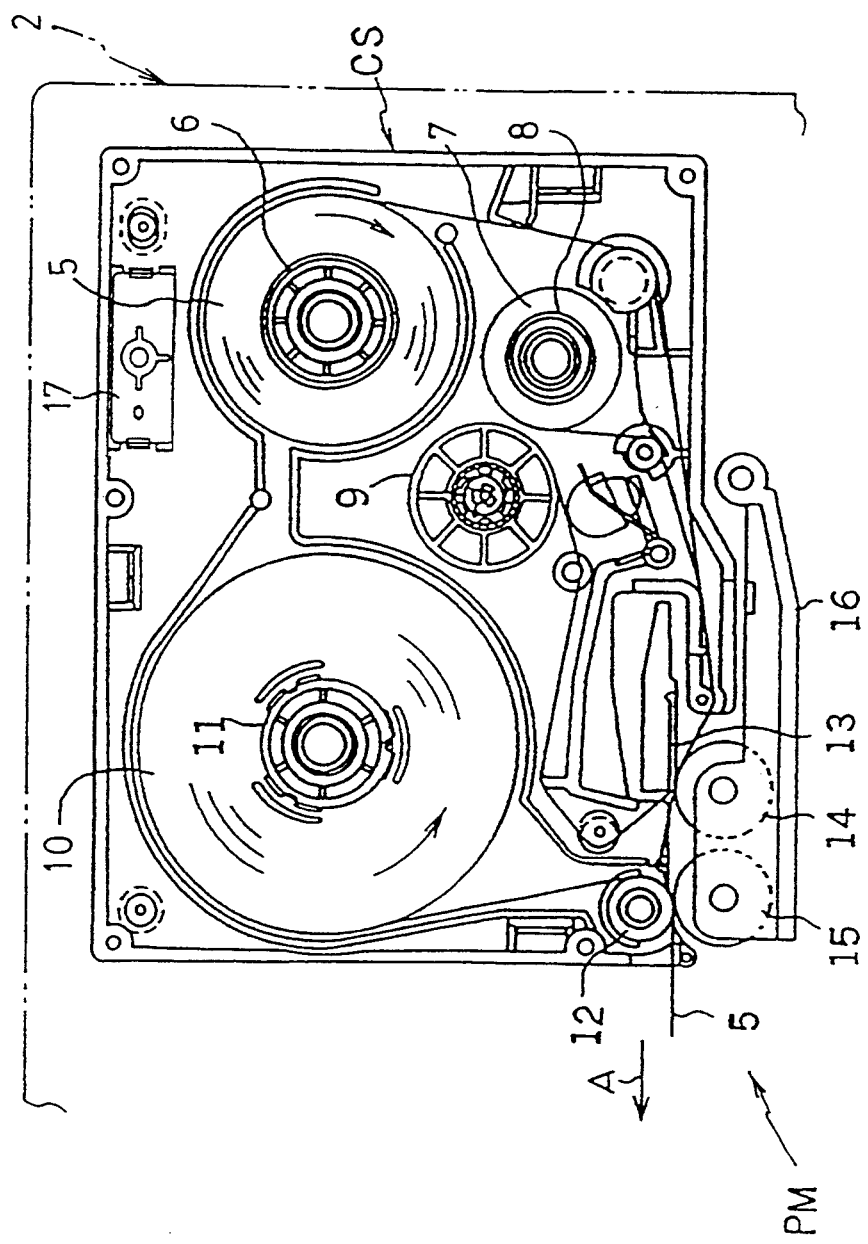
FIG. 2 is a schematic plan view of a print mechanism of the print device of FIG. 1.

Next, the print mechanism PM will be explained with reference to FIG. 2. A tape storage cassette CS having a substantially rectangular shape is detachably installed in the print mechanism PM. A tape spool 6, a ribbon supply spool 8, a take-up spool 9, a supply spool 11 and an adhering roller 12 are rotatably disposed in the tape storage cassette CS. A tape 5 for printing which is made of a transparent film, preferably being about 24 mm in width, is wound on the tape spool 6. An ink ribbon 7 is wound on the ribbon supply spool 8. The take-up spool 9 takes up the ink ribbon 7. A dual sided adhesive tape 10 having the same width with the tape 5 for printing is wound on the supply spool 11 such that a releasable sheet faces the outside. The tape 5 for printing is superposed on and adhered to the dual sided adhesive tape 10 by the adhering roller 12.

A thermal head 13 is disposed at a position where the tape 5 for printing is superposed on the dual sided adhesive tape 10. A platen roller 14 and a feeding roller 15 are rotatably supported on a supporter 16. The tape 5 for printing and the ink ribbon 7 are pressed to the thermal head 13 by the platen roller 14. The tape 5 for printing and the dual sided adhesive tape 10 are pressed to the adhering roller 12 by the feeding roller 15. A heat-generating element group preferably having 128 heat-generating elements arranged in a vertical direction is provided on the thermal head 13.

Therefore, when a tape feeding motor 24 (see FIG. 3) is driven so as to rotate in a predetermined rotating direction, the adhering roller 12 and the take-up spool 9 are driven so as to rotate in a predetermined rotating direction in synchronization with each other. Further, when the heat-generating element group is turned on by an electric current, characters are printed on the tape 5 for printing by a plurality of dot lines. After this, the tape 5 for printing is adhered to the dual sided adhesive tape 10 and is discharged in a tape feeding direction A (see Japanese Laid-Open Patent Publication No. 2-106555).

A cassette distinction member 17 for indicating the kind of the tape storage cassette CS, that is, for indicating the width of the tape 5 for printing stored in the tape storage cassette CS, is provided on the bottom wall of the tape storage cassette CS. A cassette distinction sensor 18 (see FIG. 3) comprising a photo interrupter for detecting a projection splinter (not shown) formed on the cassette distinction member 17 is provided on the main frame 2. Therefore, the width of the tape 5 for printing can be distinguished based on the distinction signal from the cassette distinction sensor 18. In total, there are five kinds of tape storage cassettes CS. Each tape storage cassette CS stores a tape 5 for printing having 6 mm, 9 mm, 12 mm, 18 mm or 24 mm widths.

Figure 3:
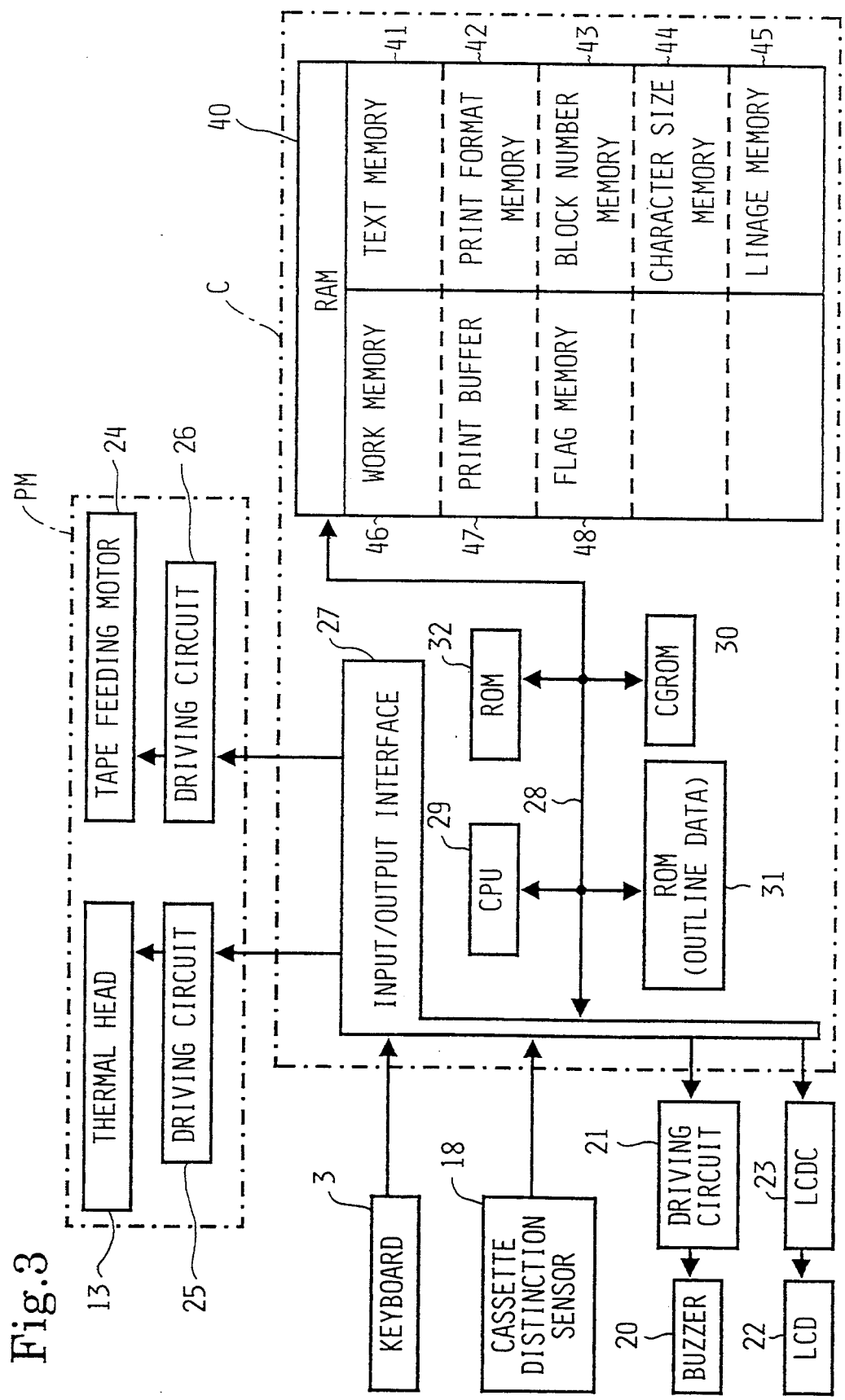
FIG. 3 is a block diagram of the control system of the tape print device.

Next, the control system of the tape print device 1 as constructed as shown in the block diagram of FIG. 3 is described.

A keyboard 3, the cassette distinction sensor 18, a driving circuit 21 for a warning buzzer 20, a display controller (LCDC) 23 having a RAM for displaying data, thereby outputting display data into a liquid display (LCD) 22, a driving circuit 25 for driving the thermal head 13 and a driving circuit 26 for driving the tape feeding motor 24 are respectively connected to an input/output interface 27 of a control device C. The control device C comprises a CPU 29, the input/output interface 27 which is connected to the CPU 29 through a bus 28, such as a data bus, a CGROM 30, ROMs 31, 32 and a RAM 40.

The CGROM (pattern data memory) 30 stores dot pattern data for displaying each of a plurality of characters such that the dot pattern data corresponds to code data for each character. The ROM (outline data memory) 31 stores outline data such that the outline data corresponds to the code data for each character. The outline data is used for regulating the outline of each character in order to print each character. Besides, the outline data for each character are classified into a type face, such as Gothic style, Mincho style, or the like. Moreover, the outline data includes various sizes in the vertical direction and in the horizontal direction of the print image.

Figure 4:
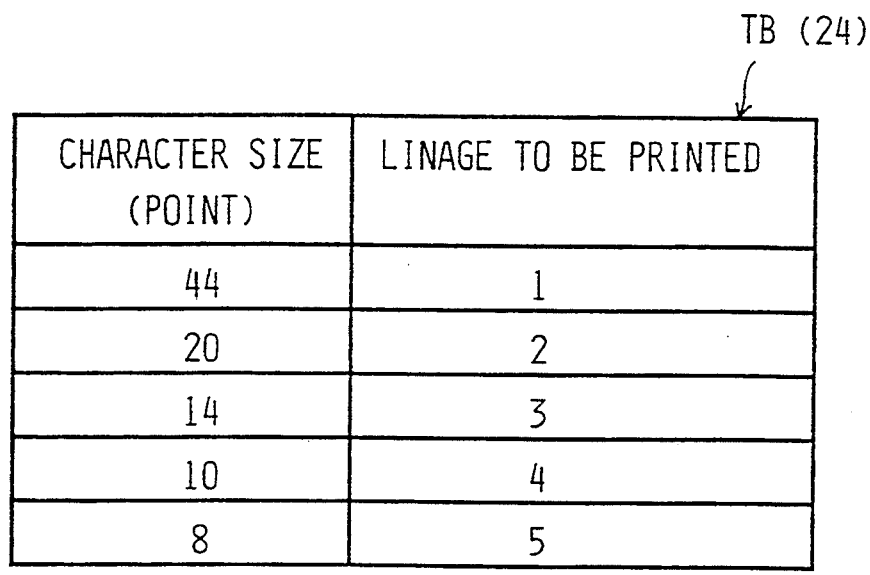
FIG. 4 is a table for indicating a sample content of a size table in accordance with the present invention.

The ROM 32 stores a display drive control program, an image develop processing control program, a print drive control program and a control program. The display drive control program is used for controlling a display controller 23 when characters, such as alphabets, figures, symbols, or the like are input from the keyboard 3. At this time, each character is made to correspond to the code data. The image develop processing control program is used for changing the outline data corresponding to each code data in a text memory 41 into the dot pattern data for printing, thereby developing a print buffer 47. The print drive control program is used for reading out in sequence the data in the print buffer 47, and driving the thermal head 13 and the tape feeding motor 24. The control program is used for controlling a tape print operation of the present invention to be described later. Further, the ROM 32 stores size tables TB for setting the character size. Each size table TB corresponds to each tape 5 for printing of the five kinds of tapes. According to the size table TB, the character size is set based on the linage to be printed such that characters can be printed on the tape 5 for printing. For example, as shown in FIG. 4, according to the size table TB

(24) for a tape being 24 mm in width, the character size is set for each linage from 1 to 5 such that characters can be printed on the tape. Since other size tables TB are similar to the size table TB (24), illustrations of other tables are omitted.

The text memory 41 of the ROM 40 stores the code data of the characters and symbols inputted from the keyboard 3 as document data. A print format memory 42 stores a plurality of print format information about the character size data PZ, the type face data, or the like. A block number counter 43 stores the block number N of the document data stored in the text memory 41. A character size memory 44 stores the size data PZ. A linage memory 45 stores the linage L of the block document data. A work memory 46 stores the block document data which is read out. The print buffer 47 stores the dot pattern data of a plurality of characters and symbols, which are developed in the image. Therefore, the print buffer 47 comprises a memory capacity for 128 bits (16 bytes) corresponding to 128 dots in the vertical direction (dot column direction) and a predetermined bits for 50 characters to the horizontal direction, thereby the dot pattern data of one or a plurality of lines is developed. A flag memory 48 stores flag data of an auto flag AF which is set such that the data is to be "1" when the auto size for characters is selected. Further, the ROM 40 has a buffer which temporarily stores the result calculated by the CPU 40, a counter and a pointer.

Figure 5:
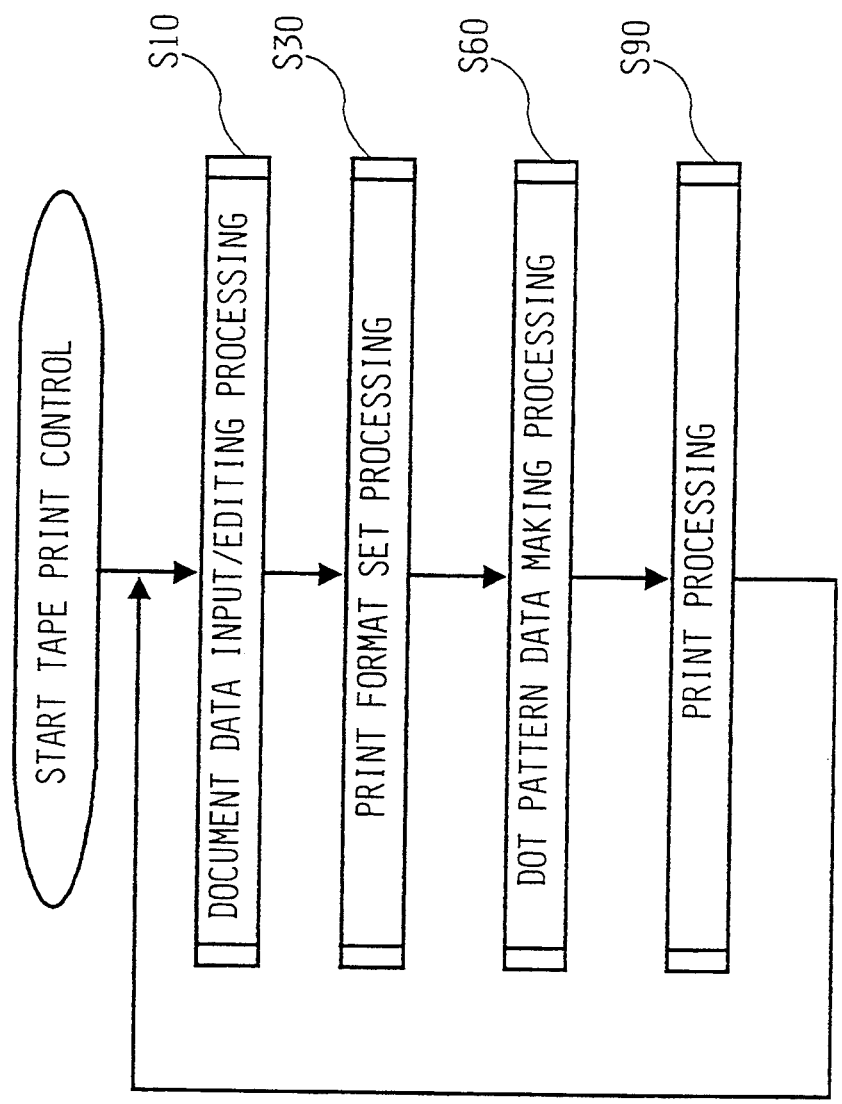
FIG. 5 is a schematic flowchart of the routine of a tape print control in accordance with the present invention.

Next, the routine of the tape print control which is executed by the control device C of the tape print device 1 will be explained with reference to the flowchart of FIG. 5. Si (i=10, 30, 60 . . . ) corresponds to each step in the figure.

When the power supply is started by way of a power supply key, the control operation is started. Next, document making keys are operated. After this, document data input/editing processing for inputting the code data as the document data is executed. The code data corresponds to the character keys, the space key, the new line key and the new block key which are operated in S10.

Next, the processing for setting the print format such as the character size, the type face, the embroidery specification, or the like, is executed by way of a format set key (S30). That is, the print format set processing comprises a plurality of format set processings, such as the character size set processing, the type face set processing, or the like. Next, the dot pattern data making processing is executed by way of the print key (S60). The dot pattern data making processing develops the dot pattern data for printing which is used for printing the document data, into the print buffer 47. The print processing for outputting the dot pattern data read out from the print buffer 47, into the print mechanism PM, is executed in S90.

Figure 6:
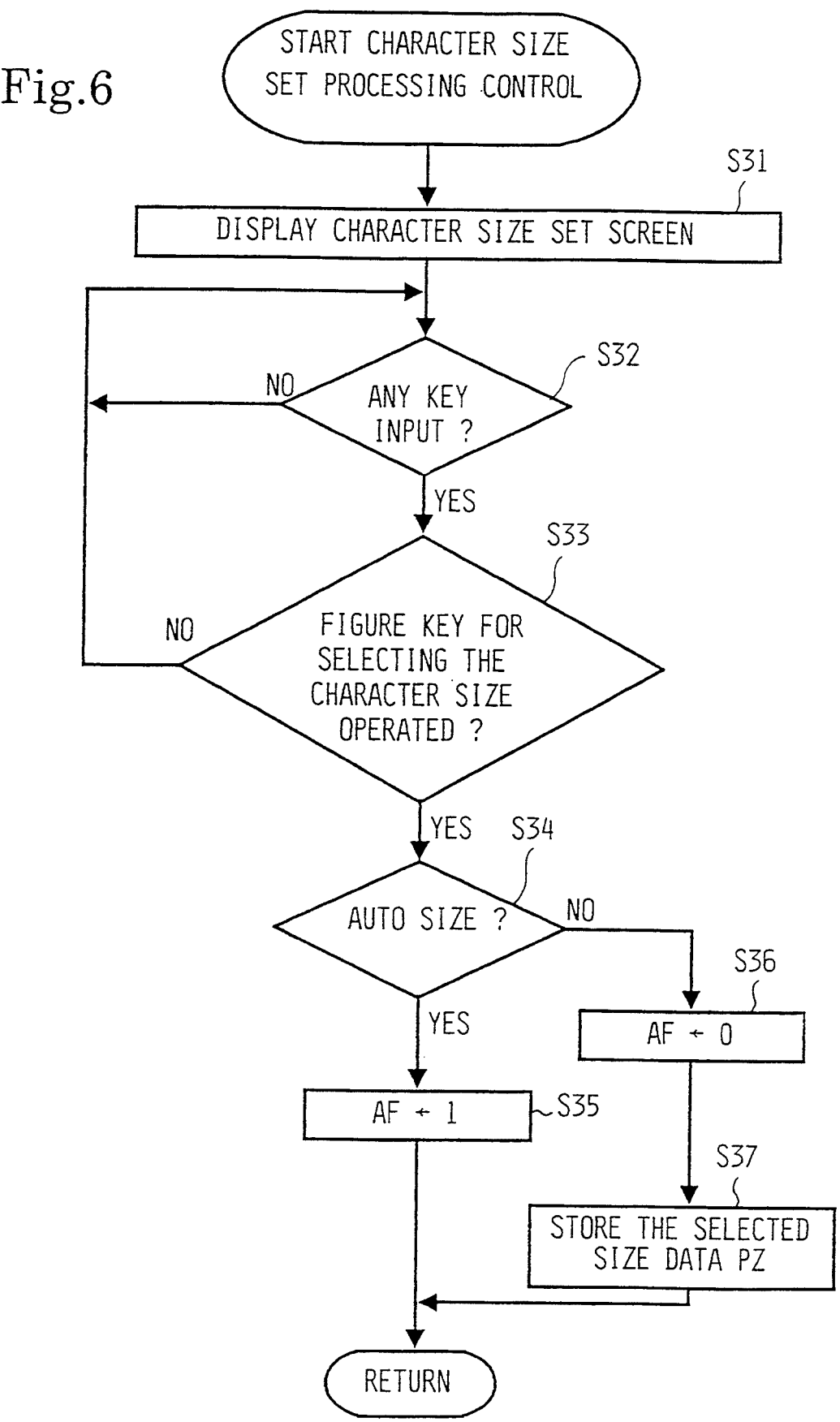
FIG. 6 is a schematic flowchart of the routine of a character size set processing control.

Next, the routine of the character size set processing control of the print format set processing will be explained with reference to the flowchart of FIG. 6.

When the size set key is operated, the character size set processing control is started. First, a character size set screen is displayed on the display 22 (S31). For example, as shown in FIG. 9, each character size is displayed in point value. These point values respectively correspond to numbers 1-6. Further, the auto size is displayed as a number 7. Next, the figure key for selecting the character size is operated (S32, S33: Yes). Further, when an arbitrary character size other than the auto size is selected (S34: No), the auto size flag AF is reset (S36), and the selected size data PZ is stored in the character size memory 44 (S37). Then, the control is completed, and the processing returns to the tape print control. However, when the auto size is selected (S34: Yes), the auto size flag AF is set, and thereby the auto size mode is set (S35). Then, the processing returns to the tape print control.

Figure 7A:
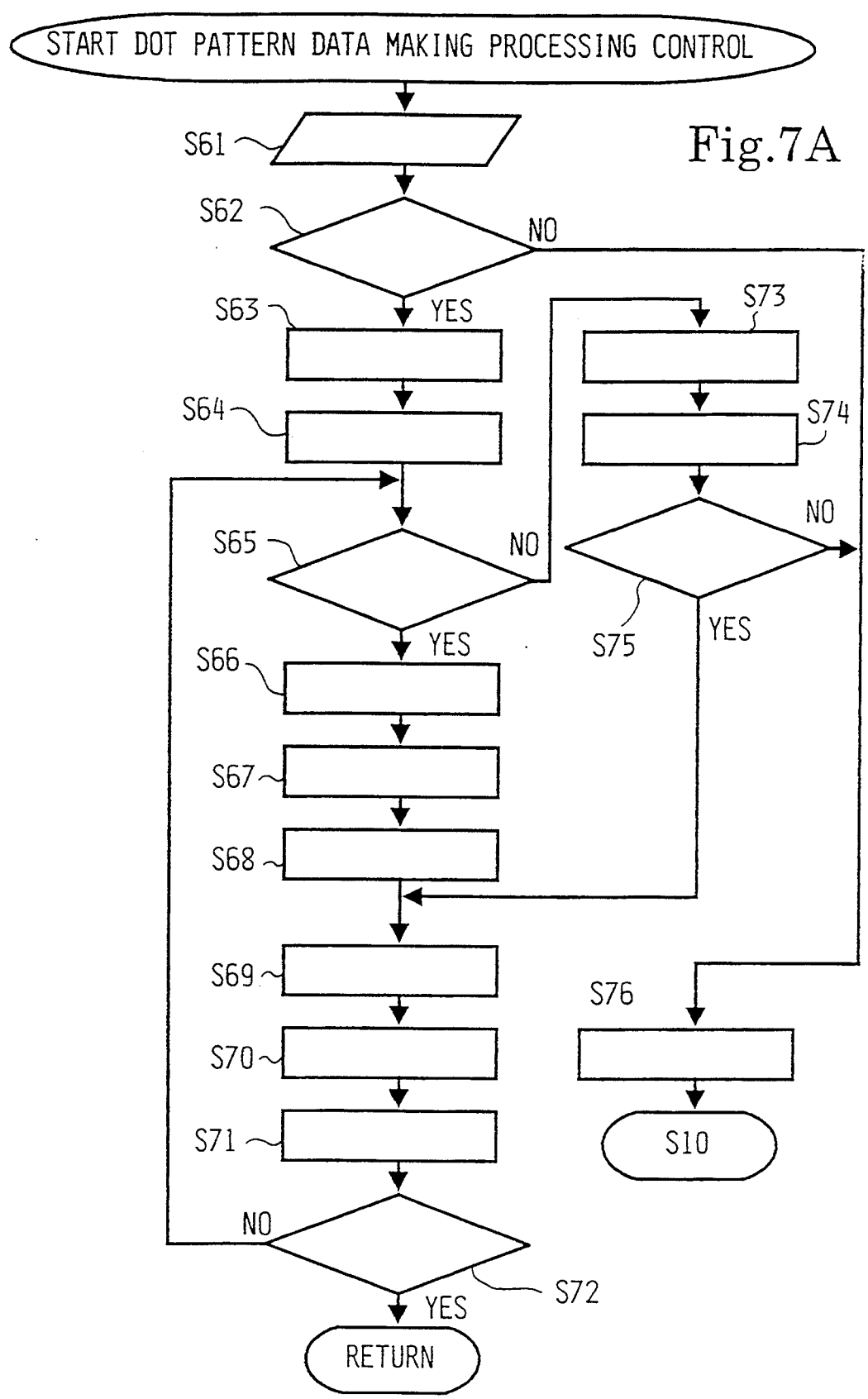
FIG. 7A is a schematic flowchart of the routine of a dot pattern data making processing control for the print.
Figure 8:
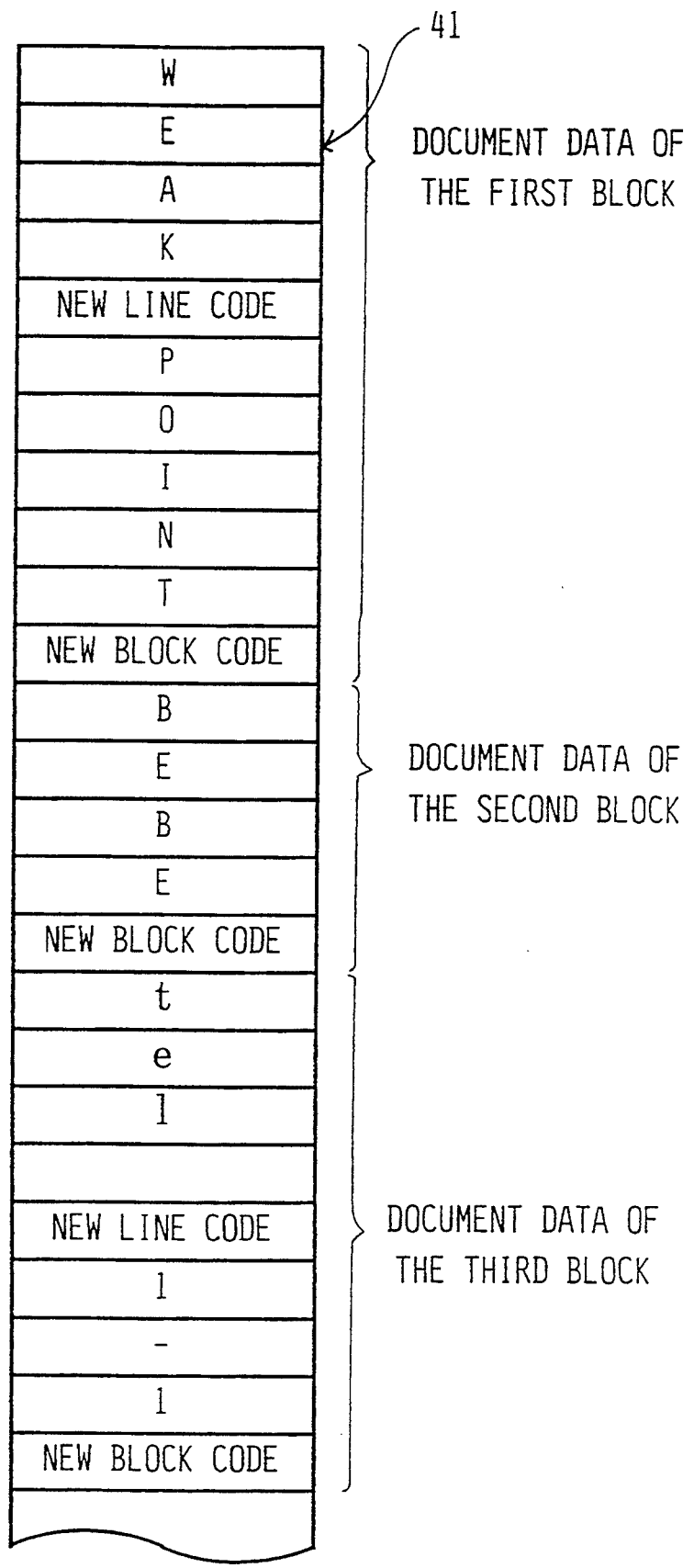
FIG. 8 is an explanatory view showing the data construction in a text memory.

Next, the routine of the dot pattern data creating processing control for printing which is executed in step S60 will be explained with reference to FIGS. 7A and 7B. At this time, as shown in FIG. 8, the text memory 41 stores in sequence the document data of the first block, the second block and the third block. New block code input by way of the new block key is stored between each block, and the character data for printing two lines is stored as the document data of the first block. The character data for printing one line is stored as the document data of the second block. The character data for printing five lines is stored as the document data of the third block (see FIG. 10).

When the control is started, first the data concerning the width of the tape is read out based on the distinction signal from the cassette distinction sensor 18 (S61). When the document data to be printed is stored in the text memory 41 (S62: Yes), the block number N is calculated based on the number of the new block codes (S63). The block number N is stored in the block number counter 43 as the block number BC (S64). Next, when the auto size mode is set (S65: Yes), the block document data of the first block is read out and stored in the work memory 46 (S66). For example, the first block document data comprising the first line "WEAK" and the second line "POINT", is stored in the work memory 46 from the text memory 41 shown in FIG. 8. Next, the linage L of the block document data is calculated based on the number of new codes and new block codes, and is stored in the linage memory 45 (S67).

Next, the size data is calculated as the auto size AP based on the size table TB corresponding to the tape width data and the linage L. That is, according to the size data, characters can be printed on the tape for printing 5. The auto size AP is stored in the size memory 44 (S68). Suppose that the width of the tape for printing 5 is 24 mm and the linage to be printed is 2. Then, as shown in FIG. 4, 20 points is calculated from the size table TB as the auto size AP. The base line position of each print line is calculated based on the auto size AP, the tape width data, the linage L and the outline data (S69). Next, the code data of each line to be printed is read out from the work memory 46 based on the base line position. While the outline data is modified or reduced, the dot pattern data for printing is formed based on the outline data. Then, the dot pattern data is developed in sequence into the print buffer 47 (S70), and the block number BC is decremented at one (S71). When the block number BC is not "0", that is, when the following block document data is stored in the text memory 41 (S72: No), the processing returns to step S65. The dot pattern data for the following block document data are formed in sequence and are developed into the print buffer 47.

When the dot pattern data for all block document data stored in the text memory 41 are formed (S72: Yes), the processing is completed. After this, the print processing is executed based on the dot pattern data stored in the print buffer 47 (S90). Similarly, the document data of the second block comprising one line and the document data of the third block comprising five lines are read out in sequence from the text memory shown in FIG. 8. The dot pattern data for each document data is formed in sequence so as to get the auto size AP calculated in each block and stored in the print buffer 47.

Figure 10:
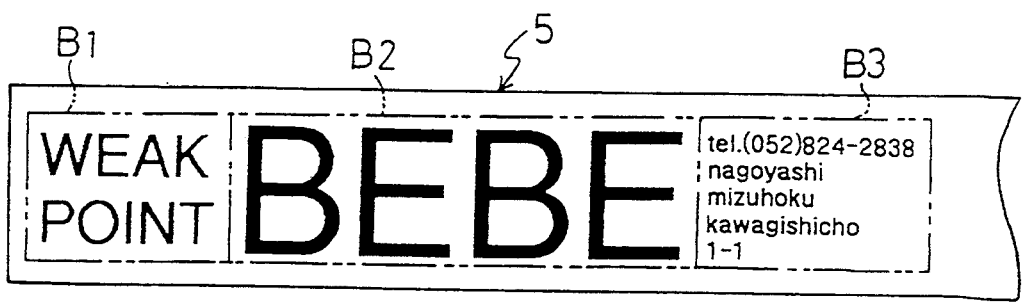
FIG. 10 is a view showing a sample tape which is printed with a set character size in each block.

Thus, the print processing is completed. As shown in FIG. 10, each character size of the first block B1, of the second block B2 and of the third block B3 are respectively set based on the linage L in each block automatically. Therefore, even if the linage L is increased or decreased, the characters and symbols in each block B1-B3 can be printed in a well-balanced arrangement on the tape. Further, the characters and symbols are printed in the same size in each block B1-B3. Therefore, the characters and symbols can be printed in a well-balanced arrangement in each block B1-B3.

On the other hand, when the auto size mode is not selected (S65: No), the block document data of the first block is read out and the linage L of the block document data is calculated in a similar manner as described above in steps S66, S67 (S73, S74). The height of the character in each line is added up based on the size data PZ stored in the character size memory 44, the tape width data, the linage L and the outline data. When the total height of the characters of each line is smaller than the height of the area to be printed on the tape 5 for printing, that is, when all the characters can be printed on the tape (S75: Yes), the processing goes to the step S69. Then, the dot pattern for the document data in each block is formed in sequence and stored in the print buffer 47. On the other hand, if the control processing is started and the document data to be printed is not stored in the text memory 41 (S62: No), or the total height of the character of each line is larger than the height of area to be printed on the tape 5 for printing, that is, when all the characters can not be printed on the tape (S75: No), a buzzer 20 makes a warning sound (S76) and the processing goes to step S10 for the tape print control.

The linage and size stored in the size table TB as described above is only one example out of many possibilities. Any linage and various sizes may be set. Moreover, various tape 5 for printing other than a tape for printing being 24 mm in width may be used. The present invention can also be applied to various tape print devices, such as a tape print device which stores the print image comprising the characters and symbols as dot pattern data. It will be understood by those skilled in the art that various changes and modifications can be made therein without departing from the scope of the invention as defined in the appended claims.

What is claimed is:

1. A tape print device comprising:
    input means for inputting characters, symbols and various commands;
    print means including a print head for forming an image on a tape;
    input data storing means for storing document data corresponding to the characters and symbols input from said input means;
    block designating means for designating a portion of the characters and symbols input by said input means as one of a plurality of block units with block unit data, and for storing the block unit data with block unit designating data into said input data storing means, said block unit designating data representing the characters and symbols forming said one of a plurality of block units;
    linage determination means for determining a linage of each of said plurality of block units;
    size setting means for setting a size of the characters and symbols of each of said plurality of block units based on the block unit data, the block unit designating data stored in said input storing means, and the linage; and print control means for producing image data based on the document data of said input data storing means, and for controlling the print means such that the print means executes a printing of a plurality of said block units along a tape.

2. The tape print device as claimed in claim 1, wherein said size setting means sets the size of characters and symbols of each block unit automatically.

3. The tape print device as claimed in claim 2, wherein the tape has various widths and said size setting means sets the size of characters and symbols of each block unit based on the width of the tape.

4. The tape print device as claimed in claim 3, further comprising a positioning means for positioning a base line at each line of each block unit based on the size of characters and symbols and said print control means produces the image from the base line.

5. The tape print device as claimed in claim 1, wherein said size setting means sets the size of characters and symbols of each block unit from a plurality of predetermined sizes.

6. A method of printing blocks of characters on a tape wherein the size of characters in each block is individually set, comprising the steps of:
    inputting characters, symbols and various commands;
    storing document data corresponding to the input characters and symbols;
    producing image data based on the stored document data;
    designating each portion of the input characters and symbols as a block unit with block unit data;
    storing the block unit data with block unit designating data representing the characters and symbols forming the block unit;
    determining a linage of the block unit;
    setting a size of the characters and symbols of the block unit based on the block unit data, the block unit designating data, and the linage; and
    printing the blocks of characters on a tape.

7. The method of claim 6, wherein setting the size of the characters and symbols comprises the step of:
    positioning a base line at each line of each block unit based on the size of characters and symbols and producing the image from the base line.

8. A tape print device comprising:
    an input inputting characters, symbols and various commands;
    a memory storing document data corresponding to the characters and symbols input from said input;
    a print controller producing image data based on the document data of said memory, and for controlling the printer such that the printer executes a print operation;
    a block designator designating a plurality of block units, each of the plurality of block units comprising a plurality of characters and symbols;
    a linage divider dividing the characters and symbols of each of said plurality of block units into a plurality of lines, said linage divider determining a linage of each of said plurality of block units;

a sizer automatically setting a size of the characters and symbols of each of said plurality of block units based on the plurality of lines divided by said linage divider, said sizer setting the size of the characters and symbols of each block unit by a determined size; and a printer including a print head for printing a plurality of said block units along a tape.

9. The tape print device as claimed in claim 8, wherein the tape has various widths and said sizer sets the size of characters and symbols of each block unit based on the width of the tape.

10. The tape print device as claimed in claim 9, wherein said sizer automatically sets the size of the characters and symbols of each block unit the same.

11. The tape print device as claimed in claim 10, further comprising a size table which stores a suitable size for the characters and symbols of each block unit according to the lines of each block unit and the width of the tape and wherein said sizer sets the suitable size stored in said size table as the size of the characters and symbols.

12. The tape print device as claimed in claim 9, further comprising a positioner positioning a base line at each line of each block unit based on the size of characters and symbols and the width of the tape, and wherein said print controller produces the image from the base line.

13. A tape print device comprising:
input means for inputting characters, symbols and various commands;
print control means for producing dot pattern data based on document data corresponding to the characters and symbols input by said input means and for controlling the print means such that the print means executes a print operation;
block dividing means for dividing the characters and symbols input by said input means into a plurality of block units, each of the block units having at least one line;
linage determination means for determining a linage of each block unit;
size setting means for setting a size of the characters and symbols of each block unit based on the number of lines divided by said block dividing means; and print means including a print head for printing a plurality of said block units along a print tape.

14. The tape print device as claimed in claim 13, wherein said size setting means automatically sets the size of the characters and symbols of each block unit.

15. The tape print device as claimed in claim 14, wherein the tape has various widths and further comprising a tape detection means for detecting a width of the tape, wherein said size setting means sets the size of characters and symbols based on both the number of lines and the width of the tape.

16. The tape print device as claimed in claim 15, wherein said each block unit has a plurality of lines and further comprising a positioning means for positioning a base line at each line of each block unit based on the size of characters and symbols set by the size setting means, wherein said print control means produces the dot pattern from the base line.

17. The tape print device as claimed in claim 13, further comprising a size storing means for storing a plurality of predetermined sizes of characters and symbols to be formed as dot patterns on the tape and wherein said size setting means sets the size of characters and symbols from a plurality of predetermined sizes stored in said size storing means.

18. The tape print device as claimed in claim 17, wherein the tape has various widths and further comprising an alarm means for warning of setting an oversized image within the width of the tape by said size setting means.

* * * * *